United States Patent
Goldberg et al.

(10) Patent No.: US 7,318,168 B2
(45) Date of Patent: Jan. 8, 2008

(54) BIT MAP WRITE LOGGING WITH WRITE ORDER PRESERVATION IN SUPPORT ASYNCHRONOUS UPDATE OF SECONDARY STORAGE

(75) Inventors: Itzhack Goldberg, Hadera (IL); Orit Nissan-Messing, Hod Hasharon (IL)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/900,656

(22) Filed: Jul. 28, 2004

(65) Prior Publication Data

US 2006/0026460 A1    Feb. 2, 2006

(51) Int. Cl.
G06F 11/00    (2006.01)
(52) U.S. Cl. ............................... 714/8; 714/7
(58) Field of Classification Search .................. 714/8, 714/7, 9, 5
See application file for complete search history.

(56) References Cited

U.S. PATENT DOCUMENTS

| | | | | |
|---|---|---|---|---|
| 4,426,688 A | * | 1/1984 | Moxley | 365/200 |
| 5,357,258 A | * | 10/1994 | May | 342/185 |
| 5,448,713 A | * | 9/1995 | Hamamoto | 711/154 |
| 5,528,732 A | * | 6/1996 | Klotz, Jr. | 358/1.6 |
| 5,561,778 A | * | 10/1996 | Fecteau et al. | 711/209 |
| 2007/0067556 A1 | * | 3/2007 | Dixon et al. | 711/106 |

* cited by examiner

Primary Examiner—Dieu-Minh Le

(57) ABSTRACT

A method for maintaining a bit map of data writes, the method including associating each of a plurality of bit groups in a bit map with a different one of a plurality of segments of a data storage device, where each of the bit groups includes a plurality of bits, and setting any of the bits in any of the bit groups to indicate that any portion of the segment corresponding to the bit group has been written to, where the write order of any two of the plurality of segments that have been written to is preserved by their corresponding set bit groups.

28 Claims, 3 Drawing Sheets

BIT MAP WRITE LOGGING WITH WRITE ORDER PRESERVATION IN SUPPORT ASYNCHRONOUS UPDATE OF SECONDARY STORAGE

FIELD OF THE INVENTION

The present invention relates to disaster recovery strategies for computer systems in general, and more particularly to management of bit maps in support of asynchronous update of secondary storage.

BACKGROUND OF THE INVENTION

Disaster recovery strategies for computer systems generally involve copying data stored at a primary site to a secondary site which is typically located some distance from the primary site. Copying between the primary and secondary copies may be performed either synchronously or asynchronously. Where copying is performed synchronously, each time an update is written to the primary copy, the update is also sent to the secondary site to be written to the secondary copy. Only after the secondary site informs the primary site that the secondary copy has been updated does the primary site acknowledge the update to the primary copy and stand ready to write the next update. Thus, updates are written to the primary and secondary copies in the same order. Where copying is performed asynchronously, multiple updates may be written to the primary copy and acknowledged before any updates are sent to the secondary site, as the primary copy is maintained independently from the secondary copy. The updates are sent periodically to the secondary site, typically as a set of writes referred to herein as a "color," and are written to the secondary copy, not necessarily in the same order as they were written to the primary copy.

It is often desirable to preserve the order of writes in order to maintain data consistency between the primary and secondary copies. For example, given the following typical sequence of dependent writes for a data base update transaction:

1. execute a write to update the data base log indicating that a data base update is about to take place, then
2. execute a second write to update the data base, and finally
3. execute a third write to update the data base log indicating that the data base update has completed successfully, it is imperative that these dependent writes either all belong to the same color, or, if they cross a color boundary, that the earlier write(s) belong to the old color and the later write(s) belong to the new color.

In one technique for maintaining colors, the primary site may store a copy of the data written to the primary copy, preserving the order of the writes within the color. However, since the amount of space available for maintaining the color is typically limited, it is often necessary to switch to a bit map mode where, instead of storing a copy of the data and the order in which the data are written, a bit map is maintained where each bit in the bit map corresponds to a different segment of primary storage, such as a disk sector. Thus, if data are written to a particular segment, it's corresponding bit in the bit map is set to indicate that the segment is "dirty." In order to copy the writes belonging to the color to the secondary site, the bit map is consulted, and all dirty sectors are copied to the secondary site. However, in changing to bit map mode, the order of the writes within the color is lost and can no longer be maintained. Thus, there is no guarantee that dependent writes within a color will be written to the secondary site in the proper order, and the secondary site is effectively placed in an inconsistent state throughout the update process. If the primary site fails during this stage, the secondary site cannot be relied upon to take over, as it is not known to be consistent.

SUMMARY OF THE INVENTION

The present invention discloses a system and method for logging data writes to a bit map while preserving write order in support of asynchronous update of secondary storage.

In one aspect of the present invention a method is provided for maintaining a bit map of data writes, the method including associating each of a plurality of bit groups in a bit map with a different one of a plurality of segments of a data storage device, where each of the bit groups includes a plurality of bits, and setting any of the bits in any of the bit groups to indicate that any portion of the segment corresponding to the bit group has been written to, where the write order of any two of the plurality of segments that have been written to is preserved by their corresponding set bit groups.

In another aspect of the present invention the associating step includes associating each of the segments with a different plurality of sectors.

In another aspect of the present invention the setting step includes setting any of the bits in any of the bit groups to reflect the value of a counter.

In another aspect of the present invention the method further includes incrementing the counter any time any of the segments is written to.

In another aspect of the present invention the method further includes incrementing the counter any time any of the segments is first written to.

In another aspect of the present invention the method further includes incrementing the counter after a plurality of the segments is written to.

In another aspect of the present invention the setting step includes setting any of the bits in any of the bit groups to reflect the value of a time stamp.

In another aspect of the present invention the setting step includes setting any of the bits in any of the bit groups to reflect the value of both of a counter and a time stamp.

In another aspect of the present invention the method further includes storing a copies of data written to the same one of the segments, and preserving the write order of the copies using a linked list linking the copies in the order in which they were written.

In another aspect of the present invention a method is provided for copying data from a primary site to a secondary site, the method including traversing a plurality of bit groups in a bit map in an order defined by the bit values of the bit groups, and copying data from a plurality of segments of a data storage device at a primary site to a secondary site, where each of the segments corresponds to one of the traversed bit groups, and where the copying is performed in the traversal order.

In another aspect of the present invention the traversing step includes traversing in the order of a counter value defined by the bit group.

In another aspect of the present invention the traversing step includes traversing in the order of a time stamp value defined by the bit group.

In another aspect of the present invention the traversing step includes traversing in the order of both of a counter value and a time stamp value defined by the bit group.

In another aspect of the present invention a system is provided for maintaining a bit map of data writes, the system including means for associating each of a plurality of bit groups in a bit map with a different one of a plurality of segments of a data storage device, where each of the bit groups includes a plurality of bits, and means for setting any of the bits in any of the bit groups to indicate that any portion of the segment corresponding to the bit group has been written to, where the write order of any two of the plurality of segments that have been written to is preserved by their corresponding set bit groups.

In another aspect of the present invention the means for associating is operative to associate each of the segments with a different plurality of sectors.

In another aspect of the present invention the means for setting is operative to set any of the bits in any of the bit groups to reflect the value of a counter.

In another aspect of the present invention the system further includes means for incrementing the counter any time any of the segments is written to.

In another aspect of the present invention the system further includes means for incrementing the counter any time any of the segments is first written to.

In another aspect of the present invention the system further includes means for incrementing the counter after a plurality of the segments is written to.

In another aspect of the present invention the means for setting is operative to set any of the bits in any of the bit groups to reflect the value of a time stamp.

In another aspect of the present invention the means for setting is operative to set any of the bits in any of the bit groups to reflect the value of both of a counter and a time stamp.

In another aspect of the present invention the system further includes means for storing a copies of data written to the same one of the segments, and means for preserving the write order of the copies using a linked list linking the copies in the order in which they were written.

In another aspect of the present invention a system is provided for copying data from a primary site to a secondary site, the system including means for traversing a plurality of bit groups in a bit map in an order defined by the bit values of the bit groups, and means for copying data from a plurality of segments of a data storage device at a primary site to a secondary site, where each of the segments corresponds to one of the traversed bit groups, and where the copying is performed in the traversal order.

In another aspect of the present invention the means for traversing is operative to traverse in the order of a counter value defined by the bit group.

In another aspect of the present invention the means for traversing is operative to traverse in the order of a time stamp value defined by the bit group.

In another aspect of the present invention the means for traversing is operative to traverse in the order of both of a counter value and a time stamp value defined by the bit group.

In another aspect of the present invention a method is provided for deploying a data storage system, the method including configuring either of a color control node and a storage controller at a primary site of a data storage system to associate each of a plurality of bit groups in a bit map with a different one of a plurality of segments of a data storage device, where each of the bit groups includes a plurality of bits, and set any of the bits in any of the bit groups to indicate that any portion of the segment corresponding to the bit group has been written to, where the write order of any two of the plurality of segments that have been written to is preserved by their corresponding set bit groups.

In another aspect of the present invention a computer program is provided embodied on a computer-readable medium, the computer program including a first code segment operative to associate each of a plurality of bit groups in a bit map with a different one of a plurality of segments of a data storage device, where each of the bit groups includes a plurality of bits, and a second code segment operative to set any of the bits in any of the bit groups to indicate that any portion of the segment corresponding to the bit group has been written to, where the write order of any two of the plurality of segments that have been written to is preserved by their corresponding set bit groups.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
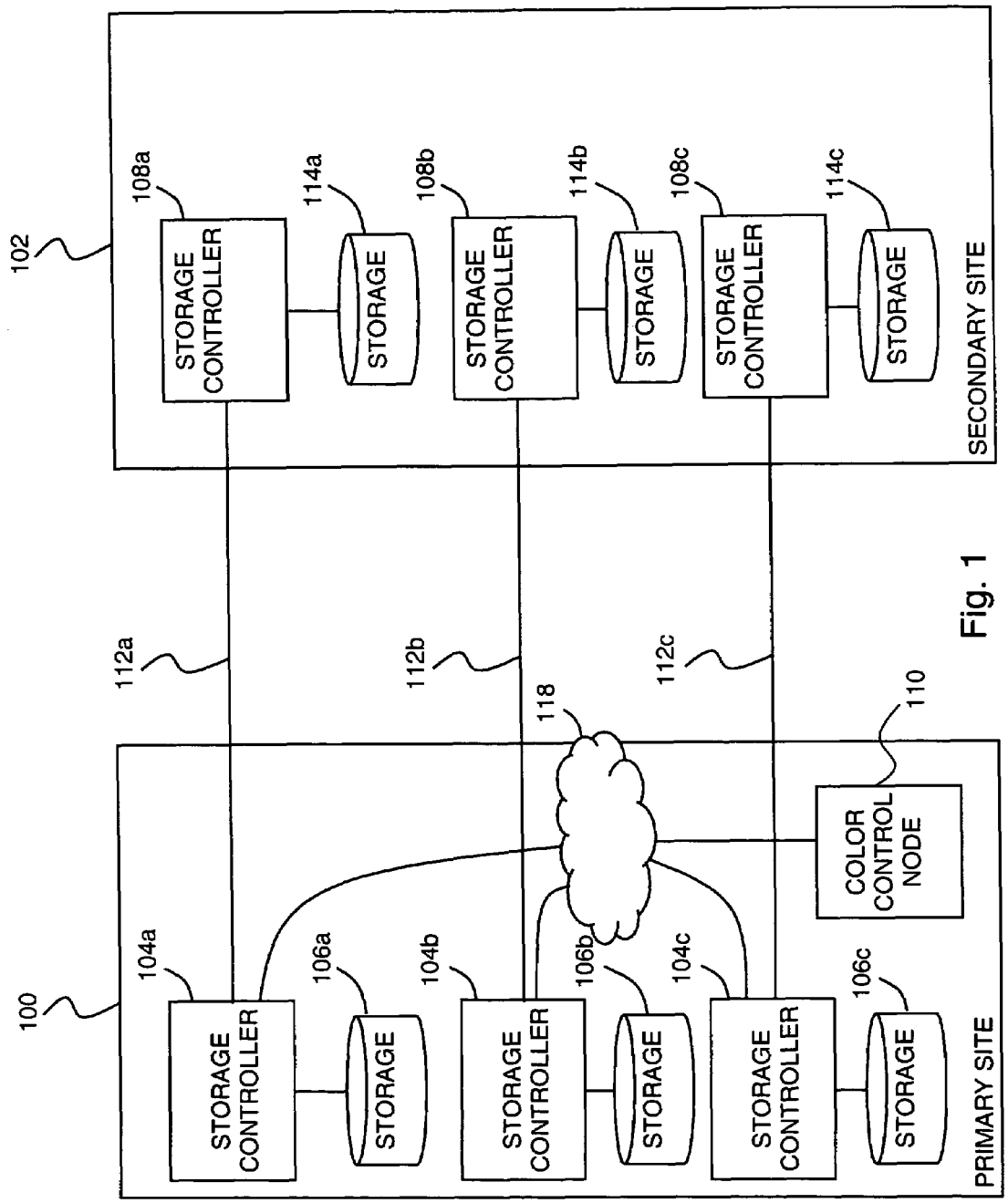
FIG. 1 is a simplified block diagram illustration of a system of primary and secondary data storage, constructed and operative in accordance with a preferred embodiment of the present invention.

Reference is now made to FIG. 1, which is a simplified block diagram illustration of a system of primary and secondary data storage, constructed and operative in accordance with a preferred embodiment of the present invention. In the system of FIG. 1, a primary site 100 includes storage controllers 104a, 104b, and 104c, coupled to storage units 106a, 106b, and 106c, respectively. Storage controllers 104a, 104b, and 104c manage Input/Output (I/O) access to volumes in storage units 106a, 106b, 106c from host systems (not shown). Storage controllers 104a, 104b, and 104c are preferably configured to asynchronously copy data to corresponding remote storage controllers 108a, 108b, and 108c at a secondary site 102 via connections 112a, 112b, and 112c. Storage controllers 104a, 104b, and 104c preferably periodically transmit sets of data writes, referred to herein as "colors," to the remote storage controllers 108a, 108b, and 108c, in accordance with conventional techniques, where the remote storage controllers 108a, 108b, and 108c write the data to their respective attached storage units 114a, 114b, and 114c. Although FIG. 1 illustrates a certain number of components at sites 100 and 102, such as three storage controllers and storages each, it is appreciated that any number of storage controllers and storage units may be used.

Secondary site 102 may be hundreds or thousands of miles from the primary site 100. The connections 112a, 112b, 112c between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Primary Area Network (LAN), or the Internet.

Host systems (not shown) at primary site 100 may perform Input/Output (I/O) operations with respect to volumes in the storage units 106a, 106b, and 106c. The host systems may communicate with storage controllers 104a, 104b, and 104c via any network or connection known in the art.

Storage controllers 104a, 104b, 104c, 108a, 108b, and 108c preferably include a processor complex and may comprise any storage controller or server known in the art, such as the IBM Enterprise Storage Server (ESS®), 3990 Storage Controller. Storage units 106a, 106b, 106c, 114a, 114b, and 114c may comprise an array of storage devices, such as a Just a Bunch of Disks (JBOD) or a Redundant Array of Independent Disks (RAID) array.

Each storage controller 104a, 104b, and 104c at primary site 100 preferably communicates, via a network 118, with a color control node 110 which preferably works simultaneously with multiple storage controllers operating within the same data storage site. Storage controllers 104a, 104b, and 104c preferably write data to storage as part of a particular write set, or "color," managed by color control node 110, such as in the manner described in greater detail hereinbelow with reference to FIGS. 2 and 3.

Figure 2:
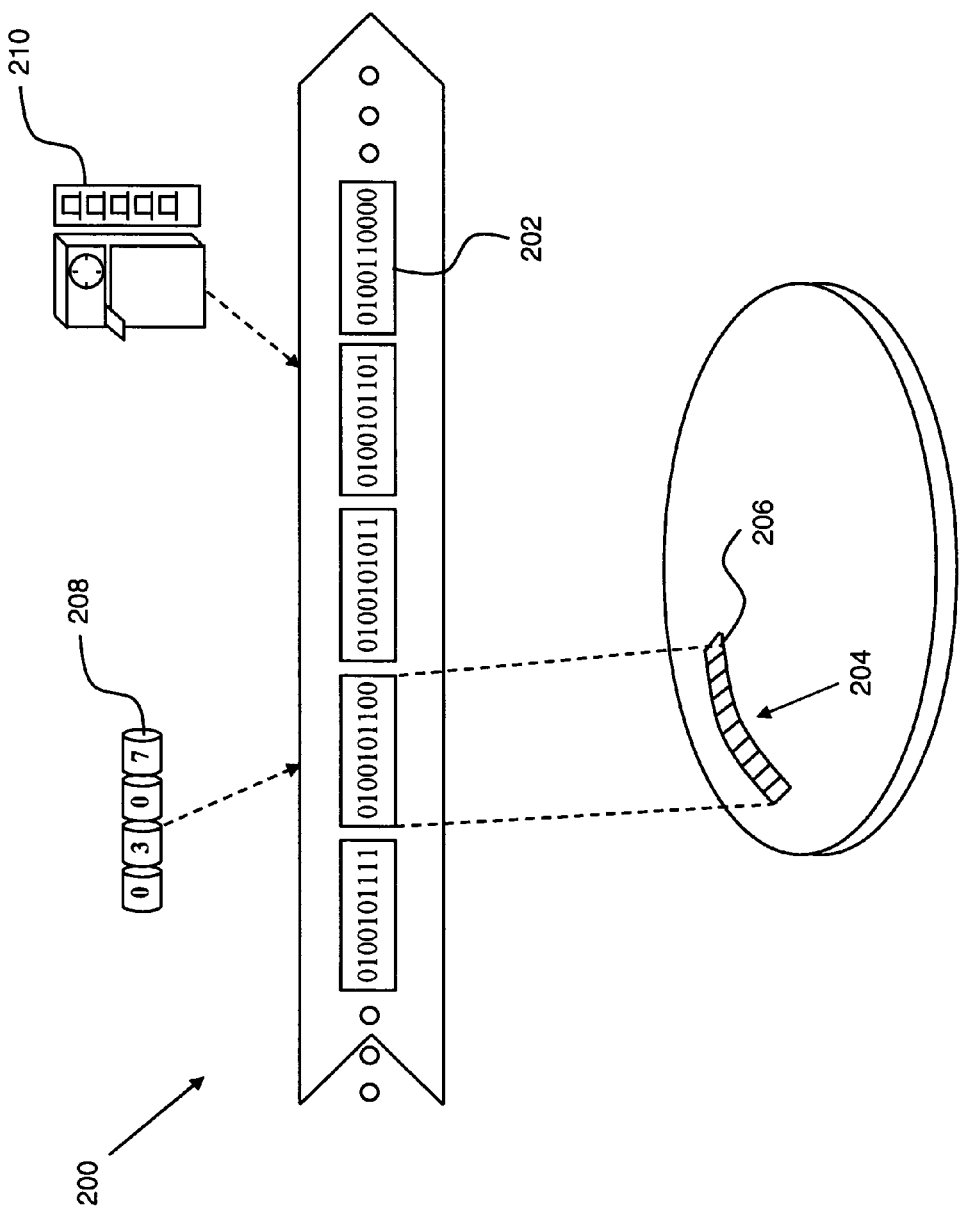
FIG. 2 is a simplified pictorial illustration of a bit map with write order preservation, constructed and operative in accordance with a preferred embodiment of the present invention.
Figure 3:
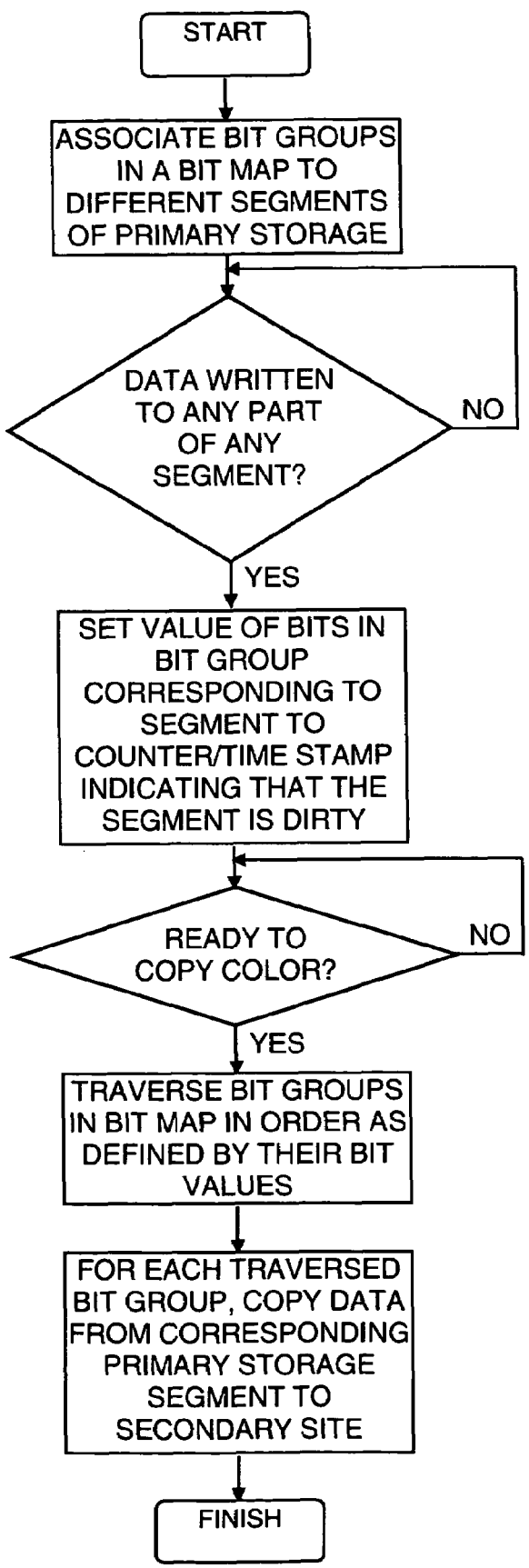
FIG. 3 is a simplified flowchart illustration of a method for maintaining colors, operative in accordance with a preferred embodiment of the present invention.

Reference is now made to FIG. 2, which is a simplified pictorial illustration of a bit map with write order preservation, constructed and operative in accordance with a preferred embodiment of the present invention, and additionally to FIG. 3, which is a simplified flowchart illustration of a method for maintaining colors, operative in accordance with a preferred embodiment of the present invention. In FIG. 2, a bit map 200 is shown having multiple bit groups 202, each having n bits, such as 10 bits. Each bit group 202 preferably corresponds to a different segment 204 of primary storage, such as 10 disk sectors 206. When data are written to any part of segment 204, such as to any one sector 206 in segment 204, the bit group 202 corresponding to segment 204 is set to indicate that the segment is "dirty" (i.e., has been written to).

In one embodiment, there are a sufficient number of bits in bit group 202 so as to allow bit group 202 to be set to reflect the binary value of a counter 208 maintained by color control node 110 (FIG. 1). Counter 208 may be incremented and the bit group set any time a segment 204 is written to, even if the segment has previously been written to. Alternatively, counter 208 may be incremented and the bit group set each time a segment 204 is first written to. Alternatively, different counter values may be used to represent different colors, where different bit groups 202 are set to the same counter value for multiple writes within a color, and where counter 208 is incremented to start the next color. Thus, the write order of different segments that have been written to is preserved by their corresponding bit groups where the bit group values differ.

In another embodiment, there are a sufficient number of bits in bit group 202 so as to allow bit group 202 to be set to reflect the binary value of a time stamp. A clock 210 may be maintained for this purpose at the primary site. Alternatively, a hybrid method may be used where some of the bits in bit group 202 are set to reflect counter 208 and some of the bits in the same bit group are set to reflect clock 210.

Where the same segment 204 is to receive different data on multiple occasions, copies of the data may be stored in addition to bit map 200, and their order may be preserved using a linked list linking the copies in the order in which they were written.

In order to copy writes from the primary site to the secondary site, bit map 202 is consulted, and all data from dirty segments 204 of the primary storage are copied to the secondary site. Where bit groups 202 are set to counter values, dirty segments 204 corresponding to lower bit group counter values are preferably read and copied to the secondary site before dirty segments 204 corresponding to higher bit group counter values. Where bit groups 202 are set to time stamp values, copying preferably proceeds for dirty segments 204 in time stamp order starting with the oldest time stamp.

It is appreciated that the present invention may be used as an intermediate step between storing a copy of the data written to the primary copy while preserving the order of the writes within the color, and reverting to a bit map mode where each bit in the bit map corresponds to a different segment of primary storage and where the order of the writes within the color is not maintained.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for maintaining a bit map of data writes, the method comprising:

associating each of a plurality of bit groups in a bit map with a different one of a plurality of segments of a data storage device, wherein each of said bit groups includes a plurality of bits; and setting any of said bits in any of said bit groups to indicate that any portion of said segment corresponding to said bit group has been written to, wherein the write order of any two of said plurality of segments that have been written to is preserved by their corresponding set bit groups.

2. A method according to claim 1 wherein said associating step comprises associating each of said segments with a different plurality of sectors.

3. A method according to claim 1 wherein said setting step comprises setting any of said bits in any of said bit groups to reflect the value of a counter.

4. A method according to claim 3 and further comprising incrementing said counter any time any of said segments is written to.

5. A method according to claim 3 and further comprising incrementing said counter any time any of said segments is first written to.

6. A method according to claim 3 and further comprising incrementing said counter after a plurality of said segments is written to.

7. A method according to claim 1 wherein said setting step comprises setting any of said bits in any of said bit groups to reflect the value of a time stamp.

8. A method according to claim 1 wherein said setting step comprises setting any of said bits in any of said bit groups to reflect the value of both of a counter and a time stamp.

9. A method according to claim 1 and further comprising:
    storing a copies of data written to the same one of said segments; and
    preserving the write order of said copies using a linked list linking said copies in the order in which they were written.

10. A method for copying data from a primary site to a secondary site, the method comprising:
    traversing a plurality of bit groups in a bit map in an order defined by the bit values of said bit groups; and
    copying data from a plurality of segments of a data storage device at a primary site to a secondary site, wherein each of said segments corresponds to one of said traversed bit groups, and wherein said copying is performed in said traversal order.

11. A method according to claim 10 wherein said traversing step comprises traversing in the order of a counter value defined by said bit group.

12. A method according to claim 10 wherein said traversing step comprises traversing in the order of a time stamp value defined by said bit group.

13. A method according to claim 10 wherein said traversing step comprises traversing in the order of both of a counter value and a time stamp value defined by said bit group.

14. A system for maintaining a bit map of data writes, the system comprising:
    means for associating each of a plurality of bit groups in a bit map with a different one of a plurality of segments of a data storage device, wherein each of said bit groups includes a plurality of bits; and
    means for setting any of said bits in any of said bit groups to indicate that any portion of said segment corresponding to said bit group has been written to, wherein the write order of any two of said plurality of segments that have been written to is preserved by their corresponding set bit groups.

15. A system according to claim 14 wherein said means for associating is operative to associate each of said segments with a different plurality of sectors.

16. A system according to claim 14 wherein said means for setting is operative to set any of said bits in any of said bit groups to reflect the value of a counter.

17. A system according to claim 16 and further comprising means for incrementing said counter any time any of said segments is written to.

18. A system according to claim 16 and further comprising means for incrementing said counter any time any of said segments is first written to.

19. A system according to claim 16 and further comprising means for incrementing said counter after a plurality of said segments is written to.

20. A system according to claim 14 wherein said means for setting is operative to set any of said bits in any of said bit groups to reflect the value of a time stamp.

21. A system according to claim 14 wherein said means for setting is operative to set any of said bits in any of said bit groups to reflect the value of both of a counter and a time stamp.

22. A system according to claim 14 and further comprising:
    means for storing a copies of data written to the same one of said segments; and
    means for preserving the write order of said copies using a linked list linking said copies in the order in which they were written.

23. A system for copying data from a primary site to a secondary site, the system comprising:
    means for traversing a plurality of bit groups in a bit map in an order defined by the bit values of said bit groups; and
    means for copying data from a plurality of segments of a data storage device at a primary site to a secondary site, wherein each of said segments corresponds to one of said traversed bit groups, and wherein said copying is performed in said traversal order.

24. A system according to claim 23 wherein said means for traversing is operative to traverse in the order of a counter value defined by said bit group.

25. A system according to claim 23 wherein said means for traversing is operative to traverse in the order of a time stamp value defined by said bit group.

26. A system according to claim 23 wherein said means for traversing is operative to traverse in the order of both of a counter value and a time stamp value defined by said bit group.

27. A method for deploying a data storage system, the method comprising:
    configuring either of a color control node and a storage controller at a primary site of a data storage system to:
        associate each of a plurality of bit groups in a bit map with a different one of a plurality of segments of a data storage device, wherein each of said bit groups includes a plurality of bits, and
        set any of said bit groups to indicate that any portion of said segment corresponding to said bit group has been written to, wherein the write order of any two of said plurality of segments that have been written to is preserved by their corresponding set bit groups.

28. A computer program embodied on a computer-readable medium, the computer program comprising:
    a first code segment operative to associate each of a plurality of bit groups in a bit map with a different one of a plurality of segments of a data storage device, wherein each of said bit groups includes a plurality of bits; and
    a second code segment operative to set any of said bits in any of said bit groups to indicate that any portion of said segment corresponding to said bit group has been written to, wherein the write order of any two of said plurality of segments that have been written to is preserved by their corresponding set bit groups.

* * * * *